Feb. 1, 1938.  J. W. CATRON, JR  2,107,102
EYESHADE
Filed Dec. 28, 1936
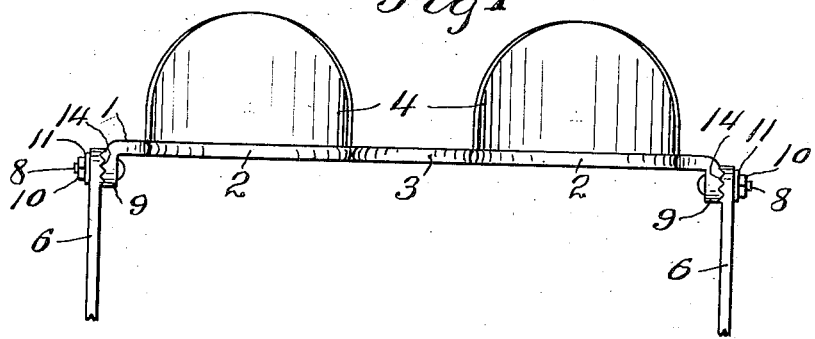
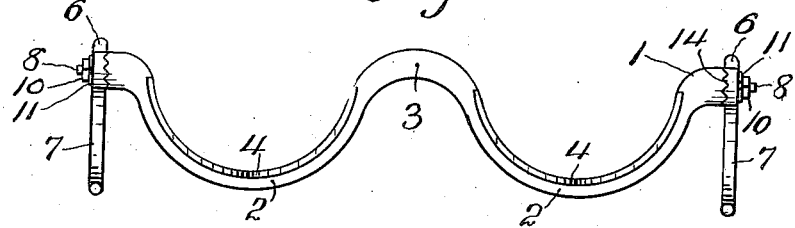
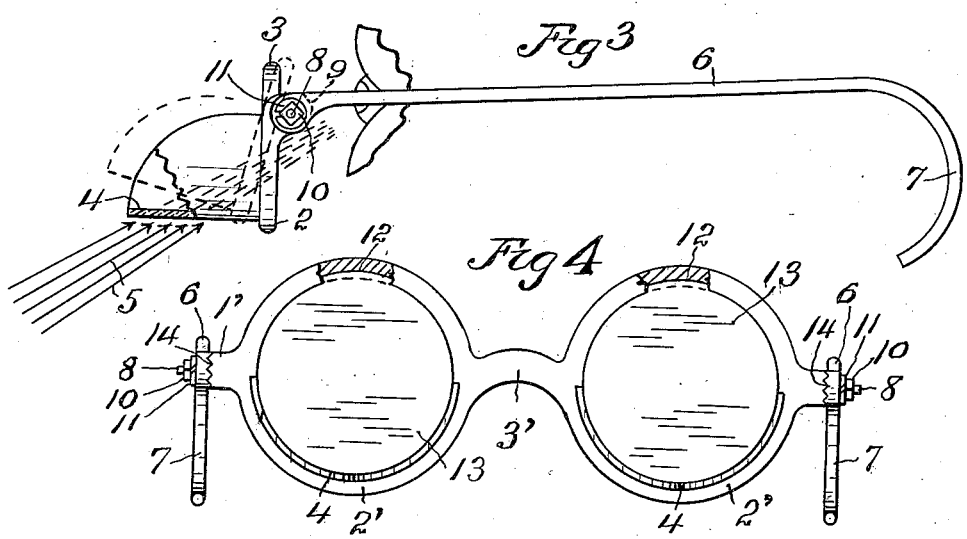
INVENTOR
Joseph W. Catron, Jr.
BY
Warren D. House
His ATTORNEY Patented Feb. 1, 1938

2,107,102

UNITED STATES PATENT OFFICE 2,107,102

EYESHADE

Joseph W. Catron, Jr., Fortescue, Mo.

Application December 28, 1936, Serial No. 117,866

2 Claims. (Cl. 2—13)

My invention relates to improvements in eye shades, of a type adapted for use in the manner of a pair of spectacles.

One of the objects of my invention is the provision of an eye shade of the kind described which will protect the eyes of the wearer from the glare of light rays reflected upwardly and rearwardly toward the eyes, as from snow on the ground, without interfering with forwardly or upwardly directed vision, when the eye shade is used in driving.

A further object of my invention is the provision of novel means by which the eye shade may be adjusted to different positions to meet different conditions.

Still another object of my invention is to provide an eye shade which is simple, cheap to make, durable, not likely to get out of order, which can be easily and quickly applied to or removed from the operative position, and which is efficient in operation.

The novel features of my invention are hereinafter fully described and claimed.

In the accompanying drawing, which illustrates the preferred forms of my invention, Fig. 1 is a top view of one form of my improved eye shade, parts of the temple bars being broken away.

Fig. 2 is a front elevation of the same.

Fig. 3 is a side elevation, partly broken away of the form shown in Figs. 1 and 2.

Fig. 4 is a front elevation, of another form of my invention, comprising a pair of spectacles provided with my improvement.

Similar characters of reference designate similar parts in the different views.

Referring to Figs. 1 to 3, 1 designates a frame comprising substantially semicircular arcuate rims 2 with their concave sides up and connected by a bridge 3 adapted to rest on the nose of the wearer.

Extending respectively forwardly from and concentric with the rims 2 are two concavo-convex glare shield portions 4 of the same material as the rims, and which may be opaque, translucent or colored. These portions 4 are disposed lower than the bridge 3 and the eyes of the wearer in positions in which they will intercept light rays upwardly and rearwardly reflected toward the eyes, as from snow on the ground, some of such rays being represented by arrows 5 in Fig. 3.

Any suitable means such as are usually provided for retaining eye glasses or spectacles in operative position on the nose may be employed. In the forms shown such means comprises two temple bars 6 having end hooks 7 for engaging the ears, the forward end portions of which bars are respectively pivoted on two alined horizontal screws 8, which respectively extend through two rearwardly extending arms 9 provided one at each end of the frame 1, in the form shown in Figs. 1 to 3, and of the frame 1' in the form shown in Fig. 4.

The heads of the screws 8 respectively bear against the inner sides of the arms 9, the outer threaded ends of the screws 8 having respectively mounted on them nuts 10 which bear against resilient split washers 11 on the screws 8 and bearing against the outer sides of the arms 9. The outer sides of the latter are roughened and respectively fit against the similarly roughened inner sides of the temple bars 6.

This construction permits the frames 1 and 1' to be swung on horizontal axes, whereby the glare shield portions 4 may be tilted upwardly or downwardly from the horizontal, as illustrated in dotted lines in Fig. 3, to suit different conditions, as the different conformation of different faces.

The form shown in Fig. 4 distinguishes from the form shown in Figs. 1 to 3 only in the rims 2' being circular on their inner peripheries, and provided at their rear sides with annular grooves 12 in which are respectively fitted lenses 13 of any desired kind, whereby the eye shade may be used additionally as a pair of spectacles, or for intercepting rays from above or straight ahead. When used for the last named purpose, the lenses 13 may be translucent or colored, as desired.

In the form shown in Fig. 4, the circular rims 2' are connected by a bridge 3', and concavo-convex glare shield portions 4, corresponding to the portions 4 of Figs. 1 to 3, extend forwardly from the concentric with the rims 2', lower than the bridge 3'. The frame 1' is adapted for swinging adjustment in the same manner, as has been described with reference to the frame 1, and the glare shield portions of both forms effect the same functions in a like manner.

With the use of the glare shield portions 4 of both forms, upwardly and rearwardly reflected rays are intercepted, while permitting undisturbed vision straight forward or at an upward inclination.

By loosening the nuts 10, the temple bars 6 may be swung to the desired positions, and the nuts then tightened, or by not screwing the nuts 10 so as to completely flatten the split washers 11, the frame 1 or 1', as the case may be, can be tilted to the desired position, the roughened engaging portions of the temple bars 6 and the arms 9 of the frame holding the frame from accidentally tilting on the temple bars, such roughened portions in Figs. 1, 2 and 4 being designated by 14.

Other modifications, within the scope of the appended claims, may be made without departing from the spirit of my invention.

What I claim is:—

1. In an eye shade, a frame comprising two rims and a bridge connecting said rims and adapted to rest on the nose of the wearer, said rims having respectively lower than said bridge two forwardly extending glare shield portions disposed, when the frame is in operative position, lower than the eyes and in positions in which they will intercept rays upwardly and rearwardly reflected toward the eyes, attaching means pivotally fastened to said frame for fastening said frame which permits the frame to be swung on a horizontal axis so as to tilt said shield portions at different angles to the horizontal and means for releasably locking said frame to said attaching means in the positions to which said frame may be adjusted.

2. In an eye shade, a frame comprising two rims and a bridge connecting said rims and adapted to rest on the nose of the wearer, said rims having respectively lower than said bridge two forwardly extending glare shield portions of like color and disposed, when the frame is in operative position, lower than the eyes and in positions in which they will intercept rays, other than rays of said color upwardly and rearwardly reflected toward the eyes, two temple bars respectively pivoted to said frame on a horizontal axis, and means for releasably locking said frame in the positions to which it may be swung on said temple bars.

JOSEPH W. CATRON, Jr.